(12) United States Patent
Rakvic et al.

(10) Patent No.: US 6,668,306 B2
(45) Date of Patent: Dec. 23, 2003

(54) NON-VITAL LOADS (75) Inventors: Ryan N. Rakvic, San Jose, CA (US); John P. Shen, San Jose, CA (US); Bohuslav Rychlik, Santa Clara, CA (US); Christopher B. Wilkerson, Portland, OR (US); Jared Stark, Portland, OR (US); Hong Wang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 09/881,314

(22) Filed: Jun. 12, 2001

(65) Prior Publication Data

US 2002/0188804 A1 Dec. 12, 2002

(51) Int. Cl.[7] .............................................. G06F 12/00
(52) U.S. Cl. ......................... 711/120; 711/119; 711/118
(58) Field of Search ................................. 711/118, 119, 711/154, 170, 120, 133

(56) References Cited

U.S. PATENT DOCUMENTS

| | | | | |
|---|---|---|---|---|
| 5,689,679 A | * | 11/1997 | Jouppi ......................... | 711/122 |
| 5,848,432 A | * | 12/1998 | Hotta et al. .................. | 711/131 |
| 5,882,757 A | * | 3/1999 | Yashiro ....................... | 428/64.1 |
| 5,964,867 A | * | 10/1999 | Anderson et al. ........... | 712/219 |
| 6,092,180 A | * | 7/2000 | Anderson et al. ........... | 712/200 |
| 6,442,653 B1 | * | 8/2002 | Arimilli et al. .............. | 711/141 |

OTHER PUBLICATIONS

S. G. Abraham, R.A. Sugamar, D. Windheiser, B.R. Rau and R. Gupta, "Predictability of Load/Store Instruction Latencies," Proc. 26th International Symposium on Microarchitectures, Dec. 1993, 139–152.

L. Kurian, P.T. Hulina, and L.D. Coraor, "Memory Latency Effects in Decoupled Architectures," IEEE Transactions on Computers, 43(10): 1129–1139, Oct. 1994.

Srinivasan and A. Lebeck, "Load Latency Tolerance in Dynamically Scheduled Processors," in Proceedings of the Thirty–First International Symposium on Microarchitecture, pp. 148–159, 1998.

B. Fisk and I. Bahar, "The Non–Critical Buffer: Using Load Latency Tolerance to Improve Data Cache Efficiency," in IEEE International Conference on Computer Design, Oct. 1999.

Gary Tyson, Matthew Farrens, John Matthews, and Andrew R. Pleszkun, "A Modified Approach to Data Cache Management," in Proceedings of the 28th Annual ACM/IEEE International Symposium on Microarchitecture, pp. 93–103, Dec. 1995.

* cited by examiner

*Primary Examiner*—Donald Sparks
*Assistant Examiner*—Kathy Takeguchi
(74) *Attorney, Agent, or Firm*—Marger Johnson & McCollom, P.C.

(57) ABSTRACT

A load instruction is classified as vital or non-vital. One of a number of caches with different latencies is selected, based on a vitality of the load instruction. Data are then loaded through the selected cache into a register in a microprocessor.

37 Claims, 5 Drawing Sheets

NON-VITAL LOADS

FIELD OF THE INVENTION

This invention pertains to carrying out load instructions in a computer, and more particularly to carrying out load instructions in a timely manner.

BACKGROUND OF THE INVENTION

When a computer program executes, it typically needs to process data stored in main memory. Such data are retrieved from main memory via a load instruction. In early microprocessors, when a load instruction was executed, the program would wait until the load instruction finished before executing the next instruction. Since accessing data from main memory is generally a slow proposition relative to executing other instructions, waiting for the load instruction to complete before continuing to execute the program slowed down program execution.

More recently, microprocessors have been developed that improved instruction processing. Parallel execution of program instructions and pipeline processors, to name two examples, improve program execution by enabling other instructions to execute (at least in part) while the load instruction is being executed.

Current technology uses multi-banked or multi-ported memories to increase performance. But multi-banked memories may have bank conflicts, making multi-ported memories less efficient than comparably-sized multi-ported memories. And multi-ported memories are hard to implement, leading to increased complexity and latency.

Currently, all load instructions are treated equally. Load instructions loading data from main memory that are never actually used by the program are loaded in the same manner as load instructions bringing in data vital to program execution. Microprocessors do not consider the use of the data or the time at which the data are needed in executing the load instructions.

The present invention addresses this and other problems associated with the prior art.

DETAILED DESCRIPTION

Instead of treating all load instructions as having the same importance, load instructions are classified based on their use. For example, a load instruction that retrieves data that is never used is not as important as a load instruction whose data will be used in 10 cycles, which in turn is not as important as a load instruction that will be used in the next cycle. Load instructions are partitioned into two categories: vital and non-vital. Non-vital loads are loads whose data will not be used immediately (if at all) after the load instruction completes. Vital loads are loads where the data are needed immediately. It turns out that most load instructions are not vital: empirical tests have shown that doubling the delay on all load instructions increases program execution time by 11%, and that only 25% of load instructions are vital. (Doubling the delay for non-vital load instructions has a negligible effect on program execution time.)

There are two situations in which a load instruction is vital. The first situation is where the data are demanded. In this situation, a dependent instruction (the instruction that uses the data from the load instruction) is ready to use the data. For this to happen, two conditions have to exist. First, the dependent instruction is in the instruction window (defined as a predetermined number of instructions beyond the currently executing instruction). Recall that modern microprocessors handle several instructions at various stages at the same time. Thus, while the load instruction is retrieving data from main memory, the dependent instruction may be beginning its processing in the microprocessor. If the dependent instruction is being processed, it is within the instruction window.

The second condition controlling when data are demanded has to do with other operands of the dependent instruction. For example, consider an ADD instruction. An ADD instruction (in the most general case) takes three operands: two registers storing the values to be added together, and a third register to store the sum. To be a dependent instruction, one of the registers is the destination of the executing load instruction. If the other register storing an operand of the ADD instruction is given its value by another instruction that has not yet finished, then the ADD instruction is not ready to execute. On the other hand, if the other register already has its value, then the ADD instruction is waiting on the load instruction. If the dependent instruction is both within the instruction window and all other operands of the dependent instruction are ready, the dependent instruction is said to be demanding the data from the load instruction, and the load instruction is considered vital.

The second situation where a load instruction is vital has to do with branch instructions. Modern microprocessors include branch predictors, designed to predict and prefetch instructions that are to be processed after the branch occurs. (Prefetching involves placing the prefetched instructions in the instruction window so that they may begin to execute.) But branch predictors are not perfect, and occasionally the wrong branch is taken. When the wrong branch is taken, any processing of prefetched instructions is wasted, and instructions along the correct path need to be started.

The branch predictor operates even if the data upon which the branch depends are not available. Thus, if the branch instruction is dependent on the load instruction, even if the data are not yet loaded, the branch predictor predicts a path. If the branch predictor predicts incorrectly, this error will be determined when the branch instruction actually executes, which happens only after the load instruction completes. Thus, the execution of instructions along the correct path is blocked until the load instruction completes. To speed up detection of the incorrect branch prediction, load instructions that lead to mispredicted branch instructions are classified as vital.

There are several types of load instructions that are non-vital. The first is where data are not demanded by a dependent instruction. As the reader may infer from the above discussion dealing with dependent instructions where the data are demanded, the data are not demanded if the dependent instruction is not in the instruction window, or if other operands of the dependent instruction are not ready.

Since in these situations the dependent instruction is not blocked on the load instruction, the load instruction does not have to complete as soon as possible.

The second type of non-vital load is one leading to a correctly predicted branch. Where the branch predictor correctly predicts the branch to be taken at a branch instruction, no processing time is lost correcting a mistake. The load instruction does not have to be rushed to detect a misprediction, and may execute more slowly.

A third type of load instruction that is not vital is where the data retrieved by the load instruction are never used. This type of load instruction is called redefined. Since the data retrieved by the load instruction are never used, there is no need to rush the load instruction.

A fourth type of non-vital load instruction is where the load instruction loads data from the store buffer. In this situation, a store instruction is pending to store a data value back to main memory, from which address the load instruction is to load the data. The store buffer is typically a small but very fast memory, used to buffer a data value before it is written back to main memory. The load instruction may retrieve the data from the store buffer without accessing main memory. For this reason, the store-forwarded load instruction is not a vital load instruction.

The fifth type of non-vital load instruction is the lead to store load instruction. In this situation, the data loaded by the load instruction is being stored again to main memory. Because store instructions generally are not critical to program execution, load instructions that lead to store instructions are not vital.

Once a load instruction is classified as either vital or non-vital, the next question is the vitality to assign to the load instruction. Vitality is measured as the number of cycles between the load instruction executing (i.e., storing its data value in a register) and the data being accessed from the register by a dependent instruction. A register file may be used to track the number of cycles between the load instruction and the dependent instruction. For vital load instructions, the vitality may be set to 1 cycle, to indicate the load instruction is vital.

To take advantage of the vitality information, the level one cache (the cache closest to the processor and generally the fastest cache) is divided into a number of subcaches. Each subcache may have a different speed at which it operates (i.e., the number of cycles the subcache needs to satisfy a data request). The operating speeds of the subcaches are affected by their size and power draw. Typically, a larger subcache will use more clock cycles to satisfy a data request than a comparably-powered smaller subcache, and a cache drawing less power will use more clock cycles to satisfy a data request than a comparably-sized, higher-powered subcache. Thus, both the size and power dimensions may be adjusted to determine the number of cycles required by a subcache. Slower subcaches are typically cheaper to produce than faster subcaches, meaning that costs may be reduced by using one fast subcache along with other slower caches, as opposed to one large, fast cache.

When a load instruction is reached during program execution, its vitality is determined. The load instruction may then be queued for a subcache with the same number of cycles as the vitality of the load instruction. The load instruction may then be satisfied in time for a dependent instruction, but without requiring that the load instruction be satisfied by the fastest possible subcache.

A person skilled in the art will recognize that the described embodiment of the invention classifies a load instruction as vital or non-vital only after the load instruction has executed once. That is, the load instruction is not classified before its first execution. Since vitality may not be determined until after the data is used (if it is used at all), one pass through a load instruction is used to determine its vitality. The vitality may be used during later passes through the load instruction to improve program performance. But if a compiler is capable of analyzing a load instruction before the load instruction is executed, the load instruction may be classified before its first execution.

Figure 1:
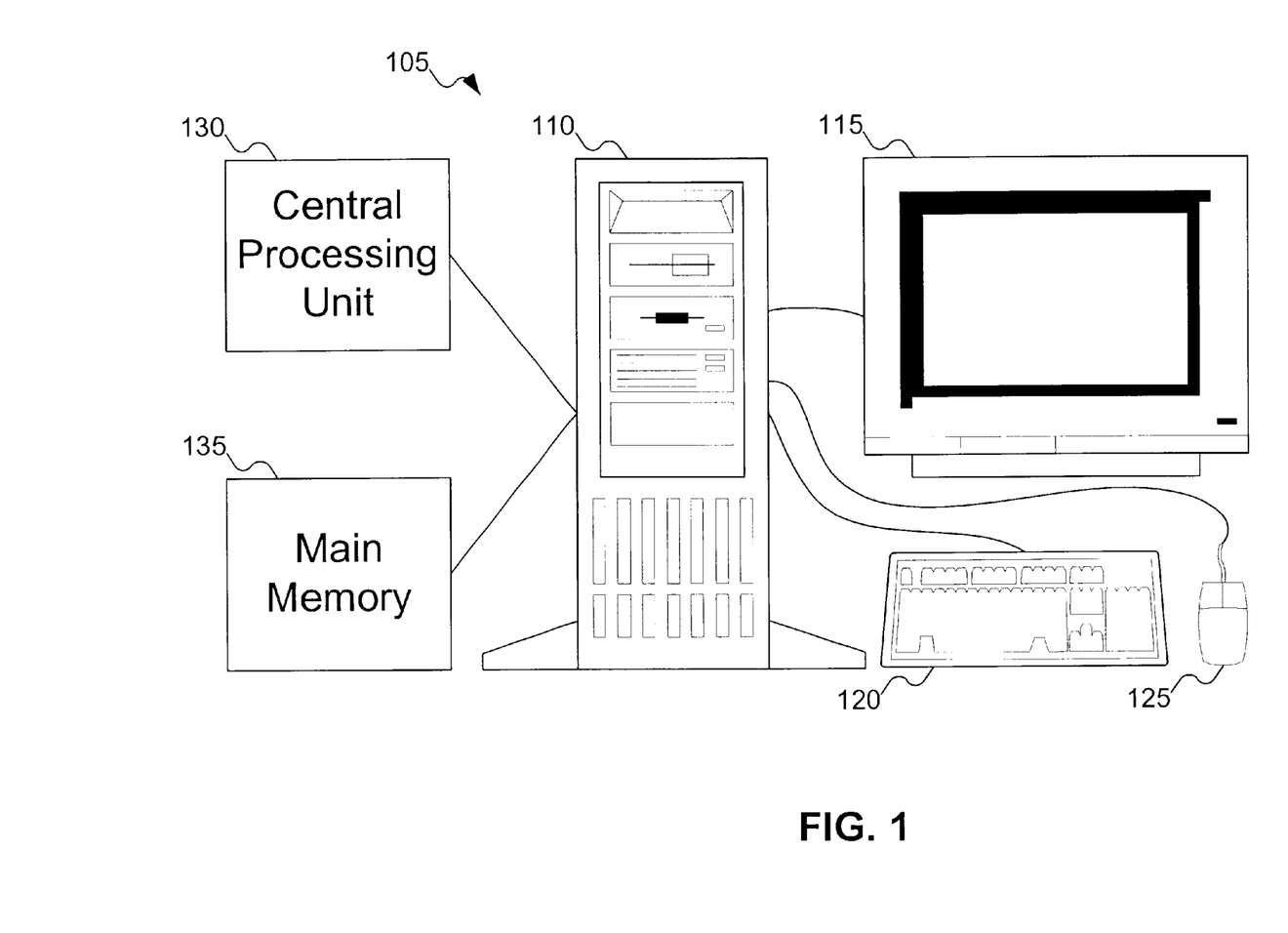
FIG. 1 shows a computer system that may load non-vital loads.

FIG. 1 shows a computer system 105 in accordance with the invention. Computer system 105 includes a computer 110, a monitor 115, a keyboard 120, and a mouse 125. Computer 110 includes hardware components, such as a central processing unit 130 and a main memory 135. Computer system 105 may also include other equipment not shown in FIG. 1, for example, other input/output equipment or a printer.

Figure 2:
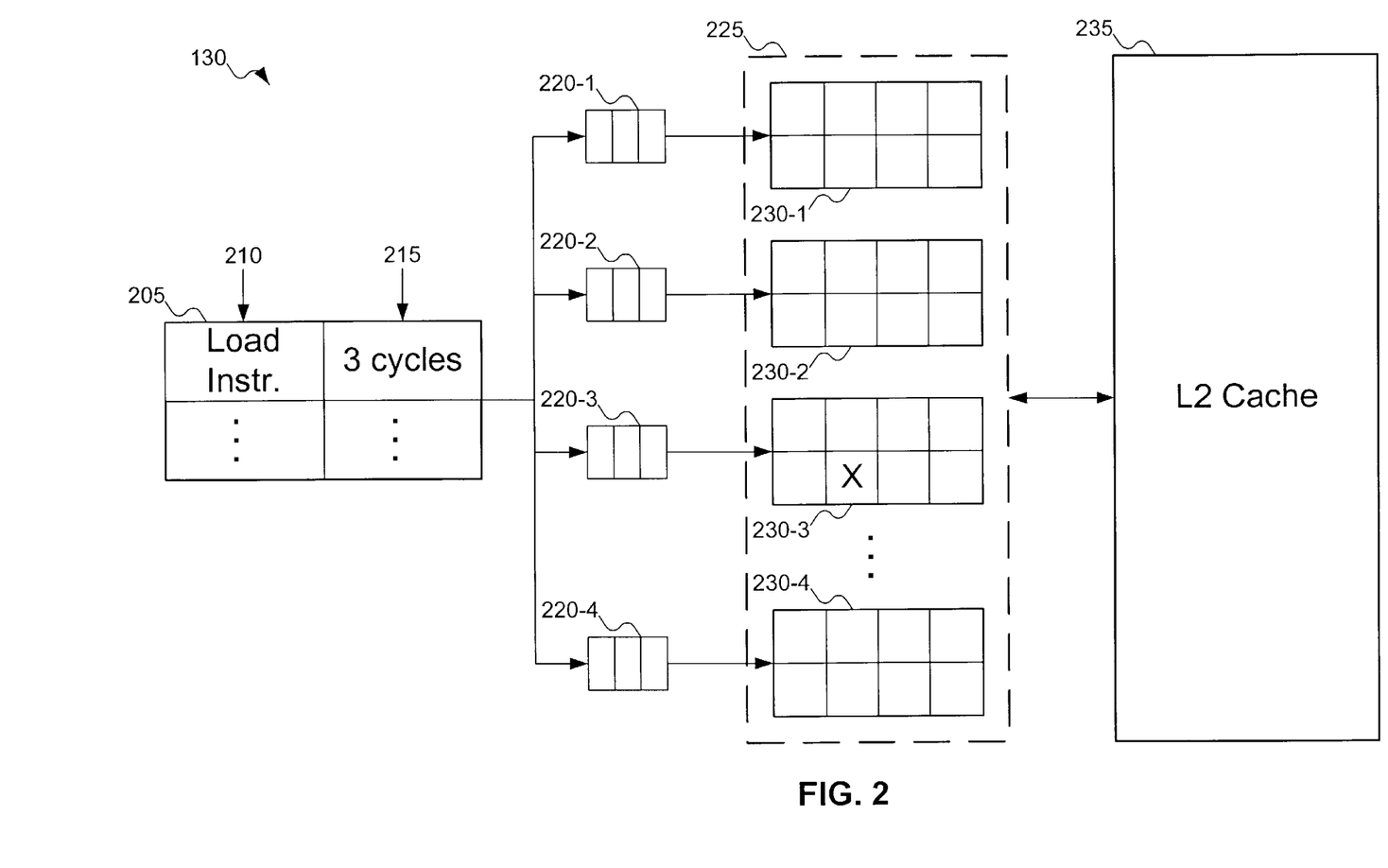
FIG. 2 shows the central processor unit of FIG. 1 in more detail.

FIG. 2 shows the central processor unit of FIG. 1 in more detail. A person skilled in the art will recognize that FIG. 2 does not show all the elements of the central processor unit of FIG. 1, but rather only the portions relevant to the embodiment of the invention. In FIG. 2, instruction cache 205 stores load instruction 210. Analysis of load instruction 210 shows that the data loaded by load instruction 210 are needed in three cycles, shown as vitality 215. Vitality 215 is stored in instruction cache 205 paired with load instruction 210.

Based on vitality 215, load instruction 210 is queued for storage in one of the subcaches of level one cache 225 in central processor 130. Queues 220-1, 220-2, 220-3, and 220-4 feed into the various subcaches of cache 225. Subcache 230-1 is the one-cycle data cache, meaning that the data stored in subcache 230-1 is to be accessed in one cycle. Subcache 230-2 is the two-cycle data cache. Subcache 230-3 is the three-cycle data cache. And so on, until subcache 230-4, which is a four-cycle data subcache. A person skilled in the art will recognize that there may be more or fewer than four subcaches, and that not all cycle times may be represented (e.g., there might not be a four-cycle subcache). Because the data loaded by load instruction 210 will be accessed in three cycles (vitality 215), load instruction 210 is queued in queue 220-3 and ultimately stored in subcache 230-3 (as shown by the X).

Also shown in FIG. 2 is level two cache 235. Level two cache 235 may be used as part of a hierarchy of caches. When a request for a data element is made of level one cache 225 but is not present in level one cache 225, the request is passed to level two cache 235. If the data element is not available in level two cache 235, the request may be passed to a level three cache, and so on until the data element is located or retrieved from main memory 135.

Figure 3:
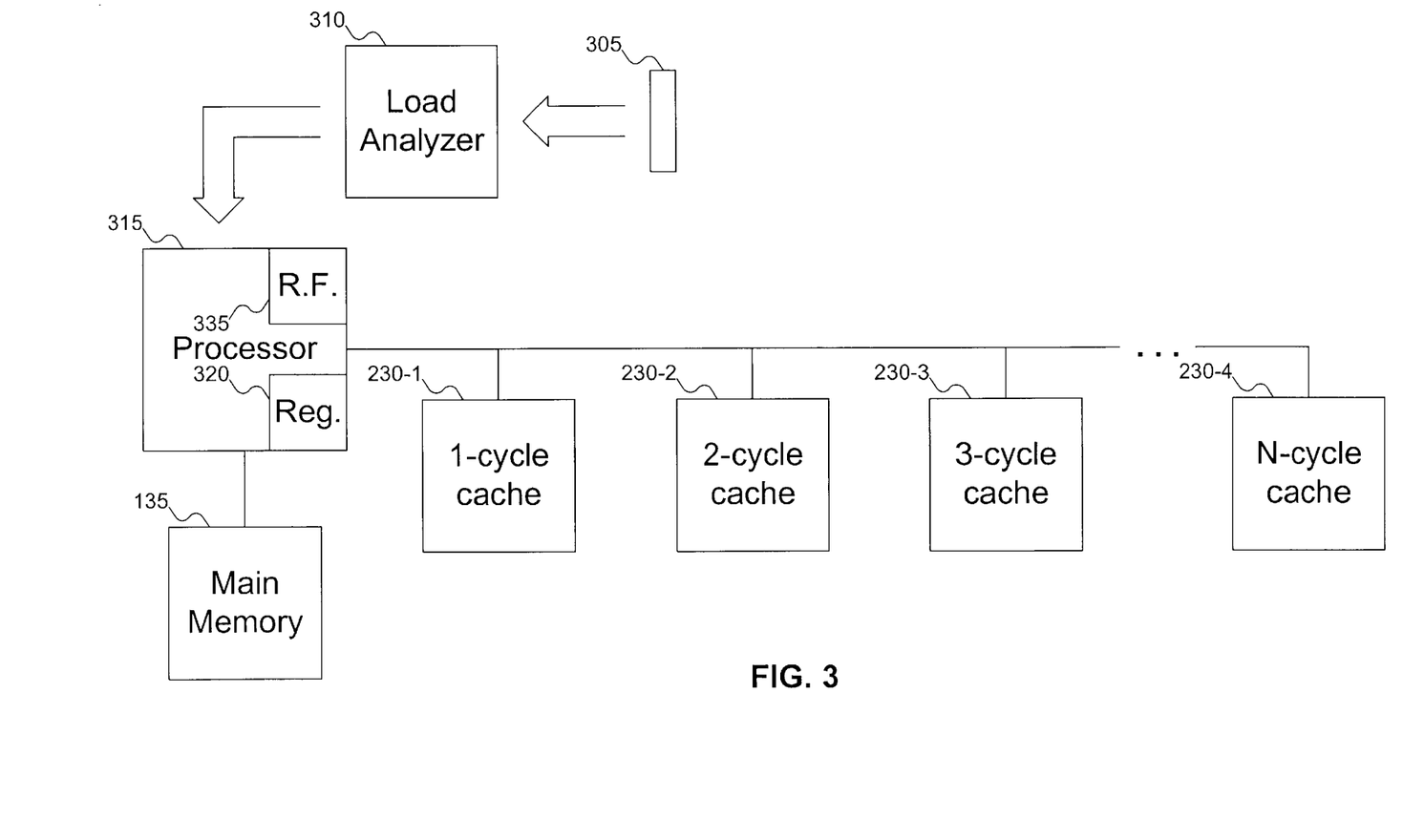
FIG. 3 shows a load instruction being analyzed and directed to one of the caches in the computer system of FIG. 1.

FIG. 3 shows a load instruction being analyzed and directed to one of the caches in the computer system of FIG. 1. In FIG. 3, load analyzer 310 analyzes load instruction 305. If load instruction 305 is vital, or if the vitality of load instruction 305 is known, load analyzer 310 passes this information to processor 315 to place load instruction 305 in the queue for the appropriate subcache of subcaches 230-1, 230-2, 230-3, or 230-4. Once the data are loaded, the data are placed in register 320.

If load instruction 305 has not yet been analyzed, then after the data are loaded into register 320, register file 335 counts the number of cycles until the data are accessed from register 320 (or, if the load instruction is redefined, the data in the register are overwritten). The vitality information is stored in the instruction cache, so that the next time load instruction 305 is encountered, its vitality will be known.

Figure 4A:
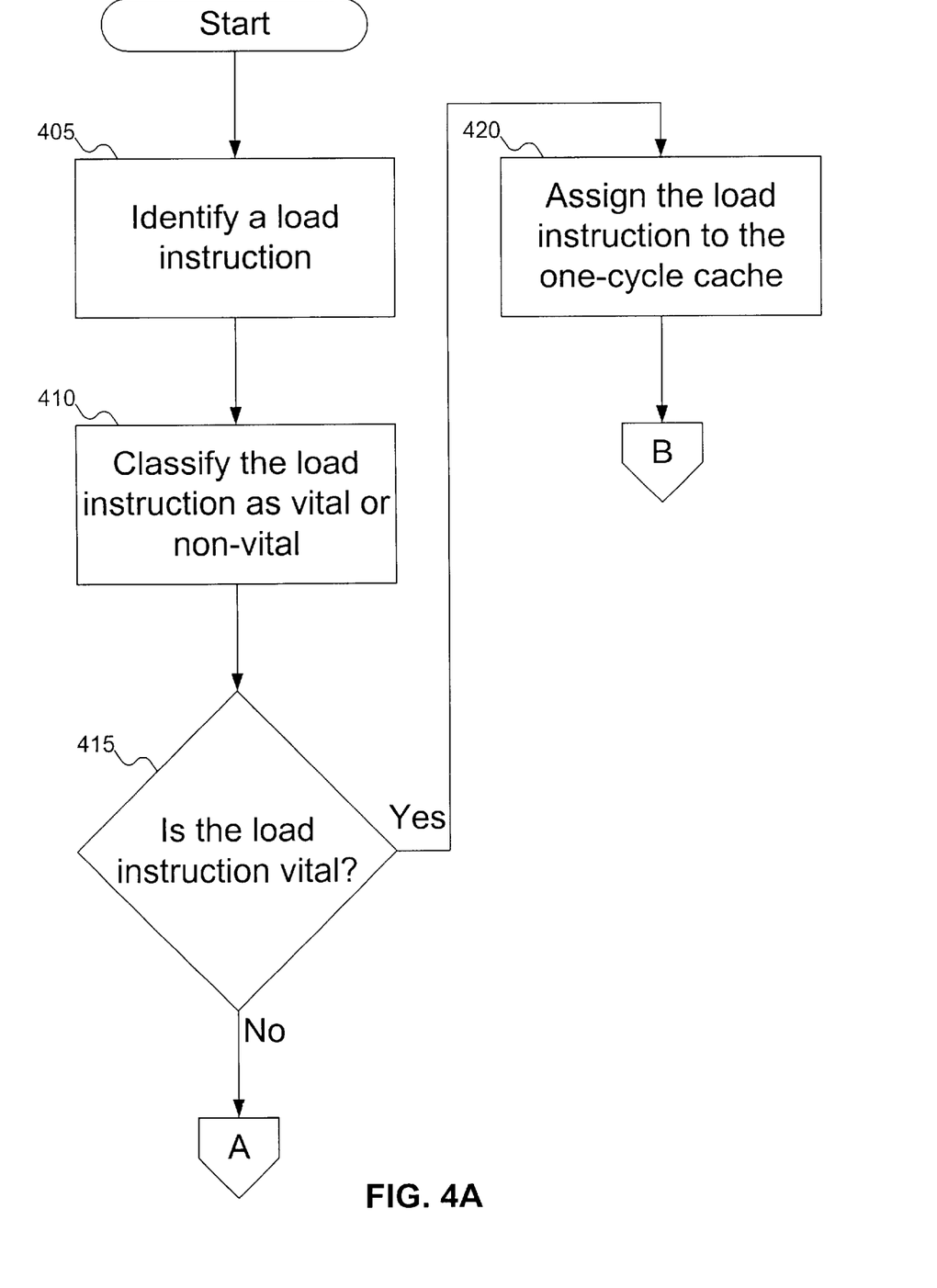
FIGS. 4A and 4B show the procedure used by the microprocessor to assign a load instruction to one of the caches in the computer system of FIG. 1.
Figure 4B:
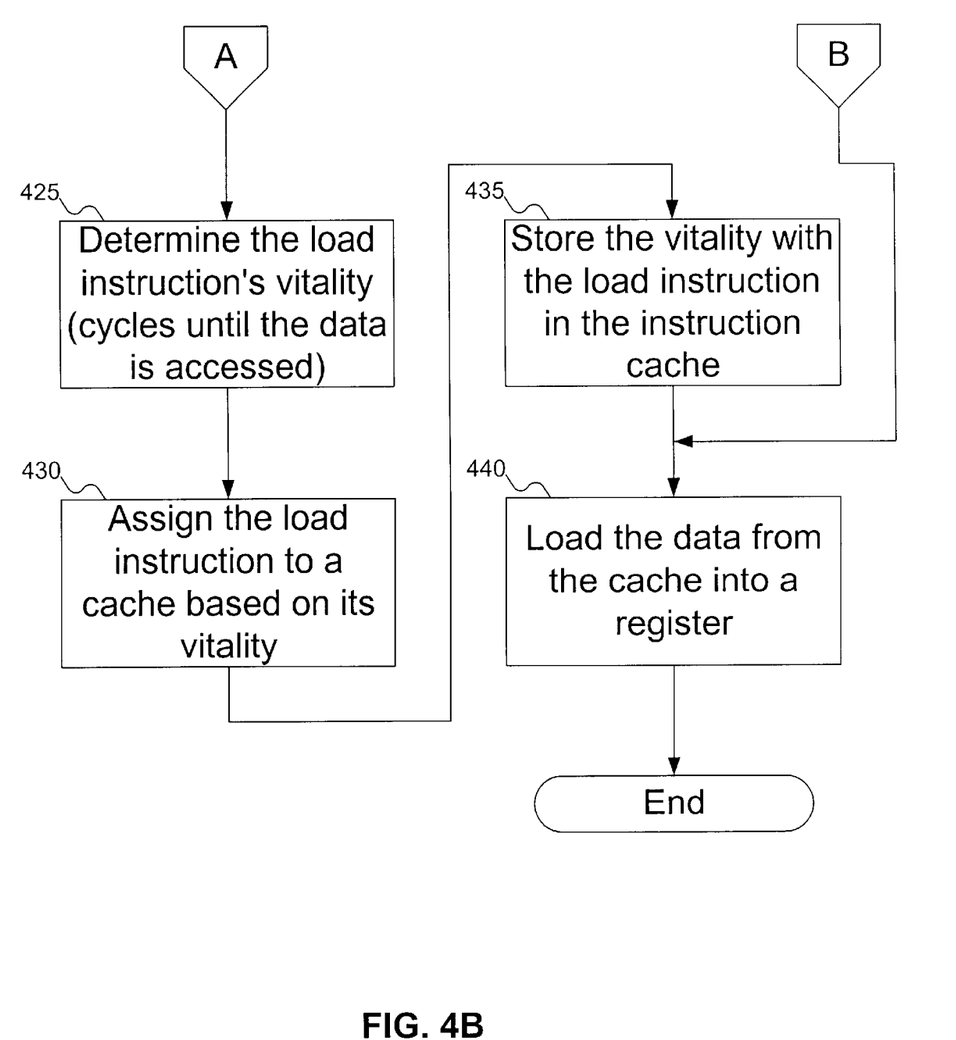

FIGS. 4A and 4B show the procedure used by the microprocessor to assign a load instruction to one of the caches in the computer system of FIG. 1. At block 405, a load instruction is identified. At block 410, the load instruction is classified as vital or non-vital. At decision point 415, the load instruction is checked to see whether the load instruction is vital or non-vital. If the load instruction is vital, then at block 420 the load instruction is assigned to the one-cycle cache. Otherwise, at block 425, the load instruction's vitality is determined. At block 430, the load instruction is assigned to a cache based on its vitality. At block 435, the vitality is stored with the load instruction in the instruction cache. Finally, at block 440, whether or not the load instruction was vital, the data are loaded from the cache into a register in the processor.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

We claim:

1. A method for performing load instructions, the method comprising:

identifying a load instruction, the load instruction including a data address storing data;

classifying the load instruction as vital if the data is demanded immediately by a dependent instruction;

selecting one of at least a first cache including a minimum latency and a second cache including a higher latency for the load instruction, so that the selected cache includes a latency higher than the minimum latency if the load instruction is non-vital; and loading the data from the selected cache.

2. A method according to claim 1, wherein selecting includes selecting the first cache if the load instruction is vital.

3. A method according to claim 1, wherein classifying the load instruction includes determining a vitality to the load instruction.

4. A method according to claim 3, wherein selecting includes selecting a cache with a latency no higher than the vitality.

5. A method according to claim 3, wherein determining a vitality includes:

counting a number of cycles between the load instruction and an operation accessing the data; and assigning the number of cycles as the vitality to the load instruction.

6. A method according to claim 1, wherein classifying the load instruction includes classifying the load instruction as non-vital if the load instruction is not a vital load instruction.

7. A method according to claim 1, further comprising attaching a vitality to the load instruction in an instruction cache.

8. An article comprising:

a storage medium, said storage medium having stored thereon instructions that, when executed by a computing device, result in:

identifying a load instruction, the load instruction including a data address storing data;

classifying the load instruction as vital if the data is demanded immediately by a dependent instruction;

selecting one of at least a first cache including a minimum latency and a second cache including a higher latency for the load instruction, so that the selected cache includes a latency higher than the minimum latency if the load instruction is non-vital; and loading the data from the selected cache.

9. An article according to claim 8, wherein selecting includes selecting the first cache if the load instruction is vital.

10. An article according to claim 8, wherein classifying the load instruction includes determining a vitality to the load instruction.

11. A method according to claim 10, wherein selecting includes selecting a cache with a latency no higher than the vitality.

12. A method according to claim 10, wherein determining a vitality includes:

counting a number of cycles between the load instruction and an operation accessing the data; and assigning the number of cycles as the vitality to the load instruction.

13. An article according to claim 8, wherein classifying the load instruction includes classifying the load instruction as non-vital if the load instruction is not a vital load instruction.

14. An article according to claim 8, the storage medium having stored thereon further instructions that, when executed by the computing device, result in attaching a vitality to the load instruction in an instruction cache.

15. A load apparatus, comprising:

a computer including a processor and a memory, the processor including at least two caches with different latencies;

a load instruction, the load instruction including a data address storing data;

a vitality determiner designed to determine a vitality for the load instruction, the vitality determiner including a register file designed to count cycles between the load instruction and a dependent instruction accessing the data and a cache assigner designed to assign the load instruction to one of the caches, based on the vitality and whether the load instruction is non-vital.

16. An apparatus according to claim 15, further comprising an instruction cache designed to store the load instruction and the vitality while the load instruction is pending.

17. An apparatus according to claim 15, further comprising a load analyzer designed to determine whether the load instruction is vital or non-vital.

18. A method for performing load instructions, the method comprising:

identifying a load instruction, the load instruction including a data address storing data;

classifying the load instruction as vital if the data is demanded immediately by a dependent instruction;

selecting, from at least a first cache including a minimum latency and a second cache including a higher latency, the second cache for the load instruction if the load instruction is non-vital;

selecting; the first cache for the load instruction if the load instruction is vital; and loading the data from the selected cache.

19. A method according to claim 18, wherein classifying the load instruction includes determining a vitality to the load instruction.

20. A method according to claim 18, wherein selecting includes selecting a cache with a latency no higher than the vitality.

21. A method for performing load instructions, the method comprising:
   identifying a load instruction, the load instruction including a data address storing data;
   classifying the load instruction as vital if a dependent branch instruction is predicted wrongly based on the data;
   selecting one of at least a first cache including a minimum latency and a second cache including a higher latency for the load instruction, so that the selected cache includes a latency higher than the minimum latency if the load instruction is non-vital; and
   loading the data from the selected cache.

22. A method according to claim 21, wherein selecting includes selecting the first cache if the load instruction is vital.

23. A method according to claim 21, wherein classifying the load instruction includes determining a vitality to the load instruction.

24. A method according to claim 23, wherein selecting includes selecting a cache with a latency no higher than the vitality.

25. A method according to claim 23, wherein determining a vitality includes:
   counting a number of cycles between the load instruction and an operation accessing the data; and
   assigning the number of cycles as the vitality to the load instruction.

26. A method according to claim 21, wherein classifying the load instruction includes classifying the load instruction as non-vital if the load instruction is not a vital load instruction.

27. A method according to claim 21, further comprising attaching a vitality to the load instruction in an instruction cache.

28. An article comprising:
   a storage medium, said storage medium having stored thereon instructions that, when executed by a computing device, result in:
      identifying a load instruction, the load instruction including a data address storing data;
      classifying the load instruction as vital if a dependent branch instruction is predicted wrongly based on the data;
      selecting one of at least a first cache including a minimum latency and a second cache including a higher latency for the load instruction, so that the selected cache includes a latency higher than the minimum latency if the load instruction is non-vital; and
      loading the data from the selected cache.

29. An article according to claim 28, wherein selecting includes selecting the first cache if the load instruction is vital.

30. An article according to claim 28, wherein classifying the load instruction includes determining a vitality to the load instruction.

31. A method according to claim 30, wherein selecting includes selecting a cache with a latency no higher than the vitality.

32. A method according to claim 30, wherein determining a vitality includes:
   counting a number of cycles between the load instruction and an operation accessing the data; and
   assigning the number of cycles as the vitality to the load instruction.

33. An article according to claim 28, wherein classifying the load instruction includes classifying the load instruction as non-vital if the load instruction is not a vital load instruction.

34. An article according to claim 28, the storage medium having stored thereon further instructions that, when executed by the computing device, result in attaching a vitality to the load instruction in an instruction cache.

35. A method for performing load instructions, the method comprising:
   identifying a load instruction, the load instruction including a data address storing data;
   classifying the load instruction as vital if a dependent branch instruction is predicted wrongly based on the data;
   selecting, from at least a first cache including a minimum latency and a second cache including a higher latency, the second cache for the load instruction if the load instruction is non-vital;
   selecting the first cache for the load instruction if the load instruction is vital; and
   loading the data from the selected cache.

36. A method according to claim 35, wherein classifying the load instruction includes determining a vitality to the load instruction.

37. A method according to claim 36, wherein selecting includes selecting a cache with a latency no higher than the vitality.

* * * * *

UNITED STATES PATENT AND TRADEMARK OFFICE
CERTIFICATE OF CORRECTION

PATENT NO. : 6,668,306 B2
DATED : December 23, 2003
INVENTOR(S) : Rakvic et al.

It is certified that error appears in the above-identified patent and that said Letters Patent is hereby corrected as shown below:

Column 6,
Line 62, "selecting; the first" should read -- selecting the first --.

Column 7,
Line 1, "to claim 18, wherein" should read -- to claim 19, wherein --.

Signed and Sealed this

Twenty-first Day of June, 2005

JON W. DUDAS
*Director of the United States Patent and Trademark Office*